July 5, 1938.  C. WULFF ET AL  2,122,805
PRODUCTION OF THERMOPLASTIC POLYMERIZATION PRODUCTS
Filed June 3, 1936
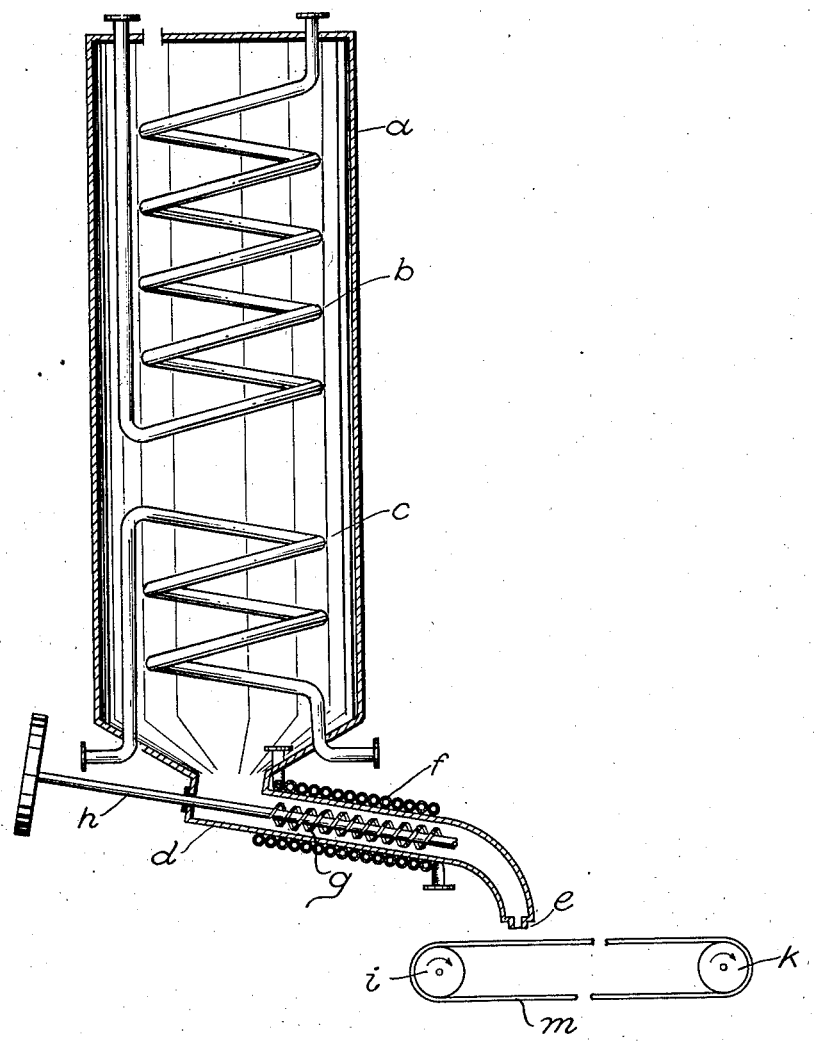
Carl Wulff
Eugen Dorrer
INVENTORS
BY
THEIR ATTORNEYS Patented July 5, 1938

2,122,805

UNITED STATES PATENT OFFICE 2,122,805

PRODUCTION OF THERMOPLASTIC POLYMERIZATION PRODUCTS

Carl Wulff and Eugen Dorrer, Ludwigshafen-on-the-Rhine, Germany, assignors to I. G. Farbenindustrie Aktiengesellschaft, Frankfort-on-the-Main, Germany Application June 3, 1936, Serial No. 83,242
In Germany October 2, 1930

12 Claims. (Cl. 260—2)

The present invention relates to the production of thermoplastic polymerization products.

This application is a continuation in part of our copending application Ser. No. 565,286, filed September 26th, 1931.

The polymerization of styrene, indene, vinyl acetate, acrylic acid and its esters or nitriles and like polymerizable mono-vinyl compounds, capable of forming resinous, thermoplastic polymerization products, and of mixtures of the said mono-vinyl compounds can be carried out in a simple manner, as for example by heating with or without the employment of catalysts, such as organic peroxides, as for example benzoyl peroxide, or peracetic acid or tin tetrachloride. The polymerization products, however, are obtained as a block or in some other compact form according to the shape of the reaction vessel. In this form they can only be withdrawn from the reaction vessel with difficulty even when hot and, moreover, in order that they may be employed for lacquers or for pressure-moulding or spraying compositions they must be in a comminuted form. The comminution is usually effected by mechanical methods, as for example by turning, planing or grinding. This is expensive and offers difficulties in many cases, because the material becomes warm and consequently plastic during the comminution and sticks in the comminuting apparatus or tool. Besides this, the products resulting from the polymerization in the hitherto usual manner do not show a very high mechanical strength and are not uniform which disadvantages impair the usefulness of the polymerization products for many purposes. It has been also suggested to allow the initial material to be polymerized to flow through an inclined heated pipe so that it is subjected to the temperatures considered necessary for the polymerization for a rather short time only. For the same purpose and for avoiding discoloration, solutions of the initial materials have been forced through the said pipes or similar apparatus whereby solutions of the resinous polymerization products are obtained. In both cases, however, the products are not substantially improved in comparison to those prepared without the said precautions. Especially when working in the presence of solvents the drawback is that it is difficult to completely remove the solvents from the polymerization product, if it be desired to obtain it in the solid state. This removal is either incompletely attained or the solid products are considerably impaired by strong distillation or by acting thereon with steam. Another method which has been suggested for the polymerization of vinyl esters consists in polymerizing the said bodies by heat and adding cold vinyl ester as soon as the polymerization has set in, incompletely polymerized ester in mixture with non-polymerized ester being continuously drawn off whereupon the mixture is completely polymerized under reflux. While explosions can be thus avoided, the products are not homogeneous.

We have now found that polymerization can be effected in a very convenient manner and moreover products having a hitherto unknown mechanical strength are obtained from mono-vinyl compounds such as vinyl esters, as for example vinyl acetate, vinyl chloroacetate or vinyl chloride or mixtures thereof, and especially from mono-vinyl aryl compounds, such as styrene, chlorostyrene (vinyl chlorbenzene) and vinyl naphthalene, by avoiding, in the complete heat-polymerization, any substantial autopolymerization of the viscous primary polymerization products obtained from the said mono-vinyl compounds. The term "complete" polymerization means that the whole material intended for polymerization is polymerized to a substance which is solid at normal temperatures and is free from monomeric material. By avoiding the autopolymerization, i. e. the polymerization catalyzed by the presence of polymerization product initially formed, and the considerable evolution of heat caused by said autopolymerization, solid products can be obtained which show a mechanical strength extraordinarily superior to that of the products obtainable by the hitherto known processes, especially in the case of the said vinyl aryl compounds.

We have found that the autopolymerization can be avoided by removing heat from the whole viscous mass of the batch under treatment as soon as the temperature rises above that intended for polymerization at the most by 10° C., preferably not more than 5° C.

When the initial material is heated for some time in the hitherto usual manner, the whole mass becomes viscous, the degree of viscosity depending on the initial material, on the nature of the catalyst employed, if any, and on the temperature employed. On heating styrene, for example, to its boiling point, the increase in viscosity takes place rather rapidly and the temperature rises quickly considerably above the boiling point of styrene (145° C. at normal pressure), in many cases up to 180° C.

The development of heat and the deleterious effects resulting therefrom are avoided according to the present invention by "concentration cooling". An efficient removal of heat from the highly viscous batch by external "concentration cooling" is possible, only when working on a very small scale, for example, in vessels having a reaction space of up to 1 liter or in narrow pipes having an internal diameter of at the most say 5 inches, but even in this case the internal temperature must be controlled which feature is difficult to carry out in the said narrow pipes. We prefer, therefore, to work in large vessels which may be of any size, if they be provided with means for "concentration cooling". By the term "concentration cooling" we wish to define all kinds of cooling by which the concentration of the homogeneous viscous mass in polymerized product is maintained or even increased, that means any kind of cooling which is carried out in such a manner that the proportion of polymerized product in the said homogeneous mass remains the same or is increased during the cooling methods according to which cold diluents capable of mixing with the homogeneous, viscous mass or non-polymerized cold initial materials are introduced into the said mass in such an amount that, by the introduction of the said diluents, the proportion of polymerized product in the resulting whole mass is smaller than that before the introduction of the said diluents being outside the scope of "concentration cooling". For the sake of brevity the said specific method of cooling will be referred to in the following disclosure and in the appended claims as "concentration cooling".

The said method can be carried out in various ways. Thus for example volatile constituents can be evaporated from the batch without returning them in the cold state, so that the evaporation withdraws heat from the mass. Since, however, the mass is usually not heated to its boiling point for reasons which will be explained later, we prefer to connect the reaction vessel to an evacuating device, such as a pump, so that the boiling point of the initial material is reduced and nonpolymerized initial material may be evaporated as soon as a certain temperature is attained. This feature allows an exact control of the temperature within the mass. If it be desired to carry out the polymerization, for example of styrene, at 90° C., the initial batch of monomeric styrene is slowly heated to say 80° C. whereupon the pressure in the reaction vessel is reduced to 100 millimeters (mercury gauge) at which pressure styrene boils at 90° C. Should autopolymerization set in on further warming and the temperature rise to say 90.5° C., monomeric styrene is sucked off with the absorption of heat by evaporation thereby cooling the whole batch and giving a slight increase in the viscosity of the mass under treatment. It will be easily understood that this method works quite automatically. It can be applied of course only when polymerizing at a temperature below the boiling point of the initial material. As will be shown below this necessity is, however, valuable for several reasons.

Another method of concentration cooling consists in arranging within the reaction vessel suitable devices for indirectly cooling with a fluid, i. e. with liquids or gases such as nitrogen, carbon dioxide or air. Thus, for example, pipe coils may be arranged within the vessel, or straight pipes or other similar devices passing through the vessel or other small vessels may be arranged within the reaction vessel in the manner usually employed for internal cooling or heating. The vessel may be provided with the usual means for controlling temperature, such as thermometers or electrically recording thermo-elements, the liquid or gaseous cooling agent being passed through the cooling means as soon as the temperature within the batch rises above the polymerization temperature intended. The quantity of cooling agent employed depends of course on the nature of the reaction vessel and of the cooling devices arranged therein, the cooling effect being increased, if desired, by any usual and convenient method, for example, by providing the cooling pipes or vessels with ribs. Instead of controlling the flow of the cooling liquid or gas by hand or complicated automatic devices actuated by the temperature controlling devices, a liquid may be employed for cooling which has a boiling point corresponding to the temperature desired for the polymerization. For example water may be employed if the polymerization is to be carried out at 100° C. As soon as autopolymerization with rise of temperature sets in, the liquid passing through or contained in the cooling device is then at least partially evaporated, so that the cold of evaporation reduces the temperature of the polymerizing batch which is thus kept at 100° C. if water be employed. Instead of water methyl, ethyl, propyl or butyl alcohols, di-ethyl or propyl ethers, benzene, toluene, gasoline, mixtures of ethylene glycol and water or aqueous solutions of water-soluble salts may be employed, so that the temperature may be kept constant at the different temperatures corresponding to the boiling points of the said liquids at normal atmospheric pressure. The boiling points of the liquids can of course be varied if they are kept in the cooling device under somewhat increased or reduced pressure.

In the process according to the present invention polymerization accelerators, such as oxygen or benzoyl peroxide, glacial acetic acid, acetic anhydride, peracetic acid or other organic peroxides, or completely or incompletely polymerized mono-vinyl compounds may be employed, which permit one to carry out the polymerization in a commercially reasonable period of time even at rather low temperatures. The said accelerators are generally employed in amounts of from 0.01 to 1 per cent of the initial material these amounts varying somewhat with the specific initial material employed. In most cases from 0.05 to 0.5 per cent of the initial material is sufficient for obtaining an efficient acceleration.

Very important features especially on working with styrene are the temperature of polymerization and the purity of the initial material.

By the polymerization under said "concentration cooling" conditions at temperatures below the boiling point of styrene the resistance of the solid products practically free from monomeric substance to bending by heating under a load (Martens' test) is not only substantially improved, but the resistance to mechanical influences is also increased. These products have a viscosity of at least 1.15 centipoises in a 1 per cent solution in benzene at a temperature of 25° C. The solid products hitherto prepared from styrene had either a lower viscosity and accordingly a lower molecular weight and have never reached a strength of 12 cm. kg/cm$^2$ in the V. D. E. impact test at a temperature of about 20° C. (for this and Martens' test compare Vorschriftenbuch des Verbandes Deutscher Elektrotechniker, 17th ed. of 1930, pages 196 and seq. and British Plastics and Moulded Products Trader, vol. 2, 1931, pages 556 and seq.) or they were not free from monomeric substance and had, therefore, very low degree of resistance to heat according to the Martens' test. On working in accordance with the present invention, however, solid products practically free from monomeric substance can be obtained which have a strength considerably above 12 cm. kg/cm² and a viscosity of at least 1.15 centipoises at 25° C. Thus, for example, solid polymerization products can be obtained from styrene which show the following values of strength and resistance to bending on heating under a load according to Martens.

| Polymerization temperature | Resistance in V. D. E. impact test cm. kg/cm² at 20° C. | Resistance to bending kg/cm² about | In Martens' test stable at |
|---|---|---|---|
| ° C. | | | ° C. |
| 120 | 12 | 600 | 68 |
| 98 to 100 | 14 | 650 | 70 |
| 90 to 92 | 18 | 700 | 70 |
| 85 | 22.5 | 750 | 78 |
| 70 to 80 | 25 to 30 | 800 | 80 |

Particularly high values in the Martens' test are obtained, if the polymerization be carried out in partial vacuo.

Preferably, the highest polymerization temperature intended is not applied from the start, but the initial material, say styrene, is slowly heated first to say 50° C. and kept constant at this temperature for say 40 hours by concentration cooling; if 0.05 per cent, by weight of the styrene, of acetic anhydride is added, this period may be reduced to say 10 hours. The temperature of the batch is then slowly raised to 85° C. and kept constant at this temperature for 30 hours, or if acetic anhydride be used for 12 hours, employing concentration cooling by pumping water heated to about 80° C. through a pipe coil arranged in the reaction vessel, so that a temperature of 87° C. or higher does not occur anywhere in the reaction vessel. Similar precautions can be applied when working at other temperatures.

Generally, the polymerization is carried out at a temperature between 30° C. and the boiling point of the initial material and, in the case of styrene, preferably at from 95° degrees to 25 degrees C. below its boiling point. Very low temperatures such as from 10° to 30° C. may be applied in the case of styrene, but in this case the polymerization requires an unduly long period of time even in the presence of a polymerization accelerator.

The purity of the initial material should be as high as possible, since in the case of styrene, for example, the presence of any substantial quantities, i. e. from about 2 to about 3 per cent of the styrene, of benzene, xylene or ethyl benzene, reduces the mechanical strength of the solid final products. If products elastic to bending be desired, which become more plastic on heating, additions of softening agents, such as phthalic esters, hydrocarbons of high boiling point, as for example benzyl naphthalene, tricresyl phosphate, chlorinated naphthalene, acrylic esters, India rubber and like softeners may be added. Fillers as for example zinc oxide, quartz dust, lampblack, pigments, fish scale preparations or extracts or dyestuffs, either alone or in conjunction with softeners, added before or after the start of the polymerization, may be employed, but the amounts of these solid substances should not be higher than 50 per cent by weight of the styrene. The softeners should not be employed in quantities above 40 per cent by weight of the styrene.

In the foregoing we have mainly described the polymerization of styrene, since the difficulties in obtaining valuable products from this vinyl aryl compound and its analogues such as vinyl toluene, vinylchlorbenzene or vinyl naphthalene, are much greater than in the case of aliphatic vinyl compounds, but the specific features of the process according to the present invention are also most valuable in the polymerization of aliphatic vinyl compounds such as vinyl acetate or acrylic butyl ester or mixtures of both, or mixtures of these with styrene.

As explained in the introductory paragraphs it is often rather difficult to comminute the solid polymerization products.

We have found that the polymerization products are obtained in a particularly simple manner in such a form that they may be readily pulverized, dissolved, comminuted or rolled out, if, after the polymerization, the hot or further heated reaction product, while still soft or plastic, is pressed out from the reaction vessel by the action of a difference in pressure, which difference may be produced by the utilization of increased internal or reduced external pressure. For example, by the use of suitably shaped nozzles, threads or sticks may be directly produced which, after leaving the nozzles, are still plastic for a certain time and may, therefore, readily be collected continuously, for example on spools or bobbins. By withdrawing the product in this manner there is obtained the further advantage that even small remainders of non-polymerized products are readily removed by evaporation. The temperatures necessary for rendering the polymeric styrene soft and plastic are generally above 120° C. the plasticity rising with an increase of temperature. For injection-moulding temperatures of from about 160° to about 220° C. are usually employed. With other vinyl compounds the temperatures for softening vary depending on the initial material, polymeric aliphatic vinyl compounds, such as polymeric vinyl acetate, requiring lower temperatures than polymeric styrene, for example from about 120° to 150° C., for injection-moulding. In the case of pressure-moulding or producing powders for pressure casting or injection-moulding our improved polymerization process is of special importance, because even small amounts of non-polymerized initial materials or of solvents lower the softening point considerably. If the outlet is constructed as a nozzle, the reaction product may be pressure casted or "injection moulded" by directly pressing it into closed moulds. By "pressure-moulding" a process is meant in which a batch of the material is placed into an open mould or matrix, and pressed therein into the desired shape by pressing with a suitable die, or patrix if desired while heating; on the other hand the material to be moulded may be preheated or both steps may be taken. In pressure-casting, or "injection moulding", a closed mould is employed with a narrow, usually funnel-shaped, inlet through which the fused or plasticized material is hydraulically or otherwise pressed into the mould so as to completely fill up all the cavities of the mould even if very intricate mouldings are to be produced. In this latter method the material is preferably supplied to the pressing device in the form of a powder or of small grains, the powder or grains then being heated at least in the neighbourhood of the nozzle so that a homogeneous more or less viscous liquid passes into the mould. Since the process of pressure-casting or "injection moulding" is well known in the production of small metal articles we need not give a detailed description of it here.

An apparatus for carrying out the continuous polymerization is shown in the drawing annexed hereto. In this apparatus we have embodied all of the provisions described above but we do not wish to be restricted to such combination, the several single features being applicable singly and without the combination described. In the drawing is shown in cross-section a cylindric vessel *a* which may have a height of from 2 to 6 meters and a diameter of from 0.3 to 2 meters respectively; the vessel may consist of chromium-nickel steel or aluminium or may be lined with aluminium or may be enamelled. In the upper and lower portions of the vessel two separate pipe coils *b* and *c* are arranged, the coil *b* serving for initial heating and for concentration cooling and the coil *c* serving for fusing the polymerization product. If desired the number of the coils may be increased, a plurality of the different coils being advantageous when working in large vessels. The bottom of the vessel is shaped as a funnel and connected to an outlet pipe *d*, which ends in a slot or nozzle *e* and in which a worm conveyor *g* with a pulley *h* is arranged. The pipe *d* is partly or wholly surrounded by a heating coil *f* or any other suitable heating device. Below the slot or nozzle is arranged an endless conveyor belt *m* running on the rolls *i* and *k*.

The following examples will further illustrate how the present invention may be carried out in practice but the invention is not restricted to these examples.

*Example 1*

Monomeric styrene is introduced into an internally enamelled kettle which contains an enamelled closely wound tube coil through which liquids for heating or cooling can be passed. By means of lubricating oil heated to 60° C. and passed through the coil the styrene is slowly heated to 60° C. and kept at this temperature until it becomes viscous which result is obtained after about 40 hours. The oil passing through the coil is then warmed to 90° C. and the viscous mass is thus warmed to the said temperature and kept constant thereat for about 25 hours, any heat developed by autopolymerization being drawn off by the oil the temperature of which is kept between 80° and 90° C. after the mass has been heated to 90° C. so that the temperature of the mass does not rise above 95° C. The viscous mass is then successively slowly heated in the same manner to 100° C., 110° and 120° C. for 5 hours each. The finished polymerization product is then fused by heating to from 180° to 220° C. and removed from the kettle. To this end, the kettle may be provided with an ascending pipe reaching to its bottom and capable of being heated. When the reaction is completed, the reaction product can be forced from the ascending pipe and discharged through a nozzle 1 millimeter in diameter by pressing nitrogen into the vessel at a pressure of 30 atmospheres and the reaction product leaves the nozzle in the form of a thread, which may be comminuted very readily after solidification, or can be wound on a spool. The polystyrene thus obtained is practically free from monomeric substance. It has a viscosity of about 3.26 centipoises at 25° C. in a 1 per cent solution of benzene at room temperature which corresponds to a molecular weight of about 240,000 calculated according to the known formula of Staudinger $$\frac{\eta sp}{c} = K.M$$

in which $\eta sp$ ($=\eta$ rel. $-1$) means the specific viscosity, $c$ means the molecular concentration of the polystyrene, calculated as monomeric styrene, $M$ is the molecular weight of polystyrene, and $K$ is a constant number, which amounts to $1.8 \cdot 10^{-4}$ in the case of styrene.

*Example 2*

Monomeric styrene, which contains 3 per cent by weight of ethyl benzene and to which 5 per cent of tricresyl phosphate have been added as a softening agent, is forced under a pressure of 30 atmospheres through a pipe of about 5 meters length and 4 square centimeters cross-section, which is coiled in the form of a spiral and contains several thermo-elements. The coil is situated in a hot bath kept at a temperature of from 110° to 120° C. The outlet from the pipe is constructed in the form of a nozzle of about 1 millimeter in diameter below which a spool is arranged upon which the polymerization product issuing from the nozzle is continuously wound. By working in the said apparatus under the said conditions from 4 to 6 kilograms of a solid polymerization product having a strength of about 12 cm. kg/cm$^2$ in the V. D. E. impact test may be obtained in the course of 24 hours, the product being easily comminuted and then useful for injection-moulding. It possesses a viscosity of 1.17 centipoises at 25° C. corresponding to an average molecular weight of about 50,000.

*Example 3*

30 kilograms of monomeric styrene and 10 kilograms of solid polymeric styrene not polymerized by heating to about 95° C. in a vertical cylindrical vessel of aluminium having a content of about 200 liters and a lower heating coil arranged therein as shown in the drawing and through which water heated to 95° C. is passed, until a viscous mass is formed. After from 5 to 6 hours about 5 liters of styrene are then added per hour until the bottom of the upper coil is covered. The styrene in the lower portion of the vessel is then completely polymerized to a solid mass. This mass is then softened by heating the lower coil to from 180° to 220° C. with the aid of steam or oil while the polymerization of the styrene in the upper part of the vessel is carried out at 95° C. The finished polymerization product is drawn off at the bottom at the rate at which monomeric styrene is added at the top. The temperature of 95° C. is maintained owing to the bad heat-conductivity of the viscous polymerization product. Through the funnel shaped bottom of the vessel which is connected with a pipe provided with heating means and a worm conveyor, the pipe being closed by a plate provided with a slot or being narrowed to form a slot, the hot, plastic polymerization product is drawn off through the slot from which it is taken off by an endless belt and can be easily disintegrated after cooling. The polystyrene thus obtained has a viscosity of 1.87 centipoises at 25° C. which corresponds to an average molecular weight of 115,000. The apparatus described is capable of producing polymerized styrene in a quantity of about twice the volume of the vessel per day. Instead of styrene, its homologues, such as methyl or di-methyl styrene, vinyl chlorbenzene, vinyl phenol, vinyl acetate and similar compounds can be polymerized and disintegrated in a simple manner. The hot plastic polymerization product may be directly pressed at about 200° C. into a closed mould by means of the worm conveyor or an additional injection machine so that moulded articles are obtained by injection-moulding or the disintegrated cold material may be fed into an injection-moulding machine in which it is heated to from 180° to 220° C. before entering into the mould. In this manner the most intricate moulded articles, such as covers for electric switches or other electric insulating articles for electric or wireless apparatus of any kind, vanity boxes, powder boxes, knobs, handles, buttons, or transparent or colored artificial jewelry may be obtained in a very simple and cheap manner.

*Example 4*

In a kettle provided with a reflux condenser and an outlet at the bottom, styrene is polymerized by heating to from 80° to 90° C. for 30 hours at a pressure of 100 millimeters of mercury. Any monomeric styrene distilled off into the condenser is returned into the process or employed in another operation. The product obtained is practically free from monomeric styrene and has a viscosity of 3.26 centipoises at 25° C. corresponding to an average molecular weight of 240,000. In testing rods of the solid product obtained a strength in the V. D. E. impact test of from 16 to 18 kilograms per square centimeter, a break load on bending of 700 kilograms per square centimeter and a resistance to bending in the Martens' test on heating to 70° C. are ascertained. If the polymerization be carried out at from 70° to 80° C. at a pressure of 60 millimeters of mercury a product free from monomeric substance is obtained which has a viscosity of 6.11 centipoises at 25° C. corresponding to an average molecular weight of 500,000 and shows a strength in the impact test of 25 kilograms per square centimeter, a break load on bending of 800 kilograms per square centimeter and a resistance in the Martens' test to heating to more than 80° C. The products can be easily moulded by injection-moulding or by heat-pressure moulding. If desired, the product may be removed from the reaction vessel by fusing at about 180° C. and introducing nitrogen at the top of the vessel at a pressure of about 10 atmospheres.

*Example 5*

In the interstice of a double-walled vessel, styrene containing 0.05 per cent of its weight of benzoyl peroxide is heated for 24 hours to a temperature between 95° and 105° C., by heating water in the inner vessel to 98° C., the temperature being maintained by eventual evaporation of water in the inner vessel. After about 48 hours the styrene is polymerized to a solid mass which has a strength in the V. D. E. impact test of 17 cm. kg/cm², a viscosity of 1.86 centipoises at 25° C. corresponding to an average molecular weight of 115,000 and becomes plastic at from 180° to 220° C. After heating the product to from 200° to 220° C. the product is removed from the vessel. If desired, a mixture of 70 parts of styrene with 30 parts of acrylic butyl ester may be subjected to the polymerization described, the product having a strength of 20 cm. kg/cm², a resistance to bending of 500 kg/cm² and a resistance to heat of 50° C. Its viscosity amounts to 1.45 centipoises at 25° C. which corresponds to an average molecular weight of 77,000.

If the polymerization is to be carried out at about 80° C. benzene or ethyl alcohol is introduced into the inner vessel.

What we claim is:

1. The process of producing a solid polymer of a mono-vinyl compound, which comprises heating the mono-vinyl compound in the absence of a solvent therefor to a temperature between 30° C. and its boiling point at atmospheric pressure, and maintaining the reaction mass at the selected temperature until a polymerization product is formed which is solid at normal temperature.

2. The process of producing a solid polymer of a mono-vinyl compound, which comprises heating the mono-vinyl compound in the absence of a solvent therefor to a temperature not exceeding its boiling point, and maintaining the reaction mass at the selected temperature by cooling in such a manner that a decrease in the concentration of the polymer in the homogeneous reaction mass is avoided, the heating being continued until a polymerization product is formed which is solid at normal temperature.

3. The process of producing a solid polymer of a mono-vinyl compound, which comprises heating the mono-vinyl compound in the absence of a solvent therefor to a temperature not exceeding its boiling point at atmospheric pressure, the polymerization being carried out at a pressure below atmospheric pressure and at a temperature below the boiling point of the monomeric vinyl compound at the pressure chosen and maintaining the reaction mass at the selected temperature until a polymerization product is formed which is solid at normal temperature.

4. The process of producing a solid polymer of a mono-vinyl compound, which comprises heating the mono-vinyl compound in the absence of a solvent therefor to a temperature not exceeding its boiling point at atmospheric pressure, while cooling the reaction mass by bringing it into indirect contact with a fluid having a temperature at the most corresponding to the polymerization temperature chosen, and maintaining the reaction mass at the selected temperature until a polymerization product is formed which is solid at normal temperature.

5. The process of producing a solid polymer of a mono-vinyl compound, which comprises heating the mono-vinyl compound in the absence of a solvent therefor to a temperature not exceeding its boiling point at atmospheric pressure, while cooling the reaction mass by bringing it into indirect contact with a liquid having a boiling point corresponding to the polymerization temperature chosen, and maintaining the reaction mass at the selected temperature until a polymerization product is formed which is solid at normal temperature.

6. The process of producing a solid polymer of a mono-vinyl compound, which comprises heating the mono-vinyl compound in the absence of a solvent therefor to a temperature not exceeding its boiling point at atmospheric pressure, while cooling the reaction mass directly with a liquid incapable of dissolving the said mono-vinyl compound and having a boiling point corresponding to the polymerization temperature chosen, and maintaining the reaction mass at the selected temperature until a polymerization product is formed which is solid at normal temperature.

7. The process of producing a solid polymer of a mono-vinyl-aryl compound, which comprises heating the mono-vinyl-aryl compound in the absence of a solvent therefor to a temperature between 30° C. and its boiling point at atmospheric pressure, and maintaining the reaction mass at the selected temperature until a polymerization product is formed which is solid at normal temperature.

8. The process of producing a solid polymeric styrene, which comprises heating the monomeric styrene in the absence of a solvent therefor to a temperature between 50° and 120° C., and maintaining the reaction mass at the selected temperature until a polymerization product is formed which is solid at normal temperature.

9. The process of producing a solid polymeric styrene, which comprises heating monomeric styrene in the absence of a solvent therefor to a temperature between 50 and 65° C., and maintaining this temperature until a viscous mass is obtained and slowly raising the temperature to between 70° and 120° C., and maintaining the reaction mass at the selected temperature until a polymerization product is formed which is solid at normal temperature.

10. The process of producing a solid polymer of a mono-vinyl compound, which comprises heating a downward stream of the mono-vinyl compound in the absence of a solvent therefor to a temperature not exceeding its boiling point at atmospheric pressure, and maintaining the reaction mass at the selected temperature until a polymerization product is formed which is solid at normal temperature, heating the polymerization product obtained to fusion and removing the melt from the reaction vessel.

11. The process of producing a solid polymeric styrene, which comprises heating a downward stream of styrene in the absence of a solvent therefor to a temperature not exceeding its boiling point at atmospheric pressure, and maintaining the reaction mass at the selected temperature until a polymerization product is formed which is solid at normal temperature, heating the polymerization product obtained to fusion and removing the melt from the reaction vessel.

12. The process of producing a solid polymeric vinyl-acetate which comprises heating a downward stream of vinyl-acetate in the absence of a solvent therefor to a temperature not exceeding its boiling point at atmospheric pressure, and maintaining the reaction mass at the selected temperature until a polymerization product is formed which is solid at normal temperature, heating the polymerization product obtained to fusion and removing the melt from the reaction vessel.

CARL WULFF.
EUGEN DORRER.